(12) United States Patent
Nakagawa

(10) Patent No.: US 7,644,421 B2
(45) Date of Patent: Jan. 5, 2010

(54) OPTICAL PICKUP

(75) Inventor: Ryutaro Nakagawa, Daito (JP)

(73) Assignee: Funai Electric Co., Ltd. (JP)

(*) Notice: Subject to any disclaimer, the term of this patent is extended or adjusted under 35 U.S.C. 154(b) by 529 days.

(21) Appl. No.: 11/711,767

(22) Filed: Feb. 28, 2007

(65) Prior Publication Data
US 2007/0206450 A1 Sep. 6, 2007

(30) Foreign Application Priority Data
Mar. 3, 2006 (JP) ............... 2006-057349

(51) Int. Cl.
G11B 7/085 (2006.01)
(52) U.S. Cl. .................................... 720/685
(58) Field of Classification Search ................ 720/685, 720/672, 681, 684, 601, 649, 659, 689, 600, 720/675, 660
See application file for complete search history.

(56) References Cited
U.S. PATENT DOCUMENTS 6,249,500 B1 *  6/2001  Kanazawa et al. .......... 720/645
6,650,603 B2 * 11/2003  Michimori et al. ....... 369/30.82
6,954,935 B2 * 10/2005  Niikura et al. .............. 720/604
7,028,318 B2 *  4/2006  Tajiri ......................... 720/684
7,287,264 B2 * 10/2007  Akanuma ................... 720/681
7,522,358 B2 *  4/2009  Harada et al. ............... 359/813
2002/0041563 A1 *  4/2002  Shinozuka et al. .......... 369/244
2005/0195702 A1     9/2005  Hong et al. .............. 369/44.14
2006/0136955 A1 *  6/2006  Kim et al. ................... 720/685

* cited by examiner

Primary Examiner—Allen T Cao
(74) Attorney, Agent, or Firm—Bacon & Thomas, PLLC

(57) ABSTRACT

An optical pickup for disc device has elastic wires 15 reliably connected with a dumping gel box 6. Guide members 18 are provided integrally with the dumping gel box 6 along bottom edges of side surface 6 as of the dumping gel box 6 while portions of the guide members 18 opposing to the grooves 11 are cut out to form air outlet holes 19 for the communication of the grooves 11 with outside atmosphere. The connection wiring 13 in the form of a printed circuit film or strip is folded to have a U-shape and attached to a back surface 6b and the both side surfaces 6a of the dumping gel box 6 and both end portions 13a of the connection wiring 13 are tentatively adhered to the both side surfaces 6a of the dumping gel box 6 by quick drying adhesive 20. Thermosetting adhesive 14 is filled in the grooves 11 and heated to be set and finally adhere the both end portions 13a of the connection wiring 13 to the both side surfaces 6a of the dumping gel box 6. Ends 15b of elastic wires 15 extending from a lens holder 7 are attached against and soldered on lands 12 of the connection wiring 13.

5 Claims, 5 Drawing Sheets

OPTICAL PICKUP

BACKGROUND OF THE INVENTION

1. Field of the Invention

The present invention relates to an optical pickup to be used in a disk device such as a DVD recorder and a DVD player, and more particularly relates to an improvement in a structure of the optical pickup for attaching, to a dumping gel box, a connection wiring and elastic wires which extend from a lens holder.

2. Description of the Prior Art

A United State patent application publication No. 2005/0195702 discloses an optical pickup having elastic wires extending from a lens holder and partially extending through gel material for attenuation of vibration of the elastic wires.

The inventor of the present invention built a prototype of an optical pickup having more practical structure as shown in FIG. 5. The prototype optical pickup includes an actuator 3 mounted on a metal sliding base 2 which is supported by guide rails 1 to reciprocate in a radial direction (as shown by arrow a-b) of a disk D (see FIG. 1(b)). The optical pickup comprises a metal actuator base 4 for fixedly mounting the actuator 3 at a predetermined position on the sliding base 2, a dumping gel box 6 of synthetic resin material fixed on the actuator base 4 by a screw 5, a lens holder 7 including an objective lens OL and arranged on the actuator base 4 to oppose the dumping gel box 6, a permanent magnet 9 fixed to a supporting plate 4a which in turn is cut from the actuator base 4 and bent upward, with the permanent magnet 9 being located close to a plurality of coils 8 (a focusing coil, a tracking coil and tilting coil) mounted on the lens holder 7, and a yoke 4b which is cut from the actuator base 4 and bent upward and extends upwardly within the lens holder 7.

Grooves 11 are formed at approximately central positions on both sides 6a of the dumping gel box 6 such that the grooves are open at the top and bottom of the dumping gel box 6. The prototype optical pickup configured as mentioned above may be assembled by a following process. A connection wiring 13 of a flexible printed circuit formed with a plurality of lands 12 on both ends thereof, is folded in substantially U shape and is brought into close contact with a back surface 6b and the both side surfaces 6a of the dumping gel box 6, with the lower side of the connection wiring 13 extending along the upper surface of the actuator base 4, such that side openings of the grooves 11 are closed by the end portions 13a of the connection wiring 13. Then, the grooves 11 are filled with thermosetting adhesive 14 which, in turn, is heated, for example, at 80° C. for 20 to 30 minutes to be set and adhere the both end portions 13a of the connection wiring 13 to the respective side surfaces 6a of the dumping gel box 6. Next, a plurality of elastic wires (three wires for each side in the illustrated prototype) soldered at P to the lens holder 7 at their one ends 15a, are soldered to respective lands 12 of the connection wiring 13 at their other ends 15b to form soldering portions P. The connection wiring 13 is electrically connected to a control circuit board 16 mounted on the sliding base 2. The dumping gel box 6 is filled with dumping gel material G through which the elastic wires 15 extend.

As for the process for reading information from the disk, a control section including a microcomputer built in the disk device performs control operation to supply electric current from the control circuit board 16 through the connection wiring 13 and the elastic wires 15 to respective coils 8 to drive the lens holder 7 by the interaction of the electromagnetic field caused by the coils and the permanent magnet 9 mounted on the actuator base 4, with laser beam being projected on the disk D through the objective lens OL and reflected beam being detected to read the information recorded on the disk D.

According to the configuration of the prototype optical pickup as mentioned above, the side openings of grooves 11 are closed by the end portions 13a of the connection wiring 13 and the bottom openings of respective grooves 11 are also closed by the actuator base 4 while only the top openings of the grooves 11 are open. Accordingly, when the thermosetting adhesive 14 is filled in the grooves 11 through the top openings, air in the grooves 11 can not escape from the grooves 11 and accumulates in the lower portions of the grooves 11 so that the thermosetting adhesive 14 can not be filled in the grooves sufficiently due to the accumulation of the air and the end portions 13a of the connection wiring 13 are likely to peel from the side surfaces 6a of the dumping gel box 6 at the portions concerning with the accumulated air. When the peeling of the connection wiring 13 occurs, the connection between the elastic wires 15 and the dumping gel box 6 becomes uncertain and it will be difficult to accurately drive the lens holder 7 as desired.

SUMMARY OF THE INVENTION

In view of the above mentioned drawback of the prototype optical pickup, an object of the present invention is to provide an optical pickup in which elastic wires extending from a lens holder are connected to a dumping gel box with reliability and certainty.

To attain the object, an optical pickup according to an aspect of the present invention comprises an actuator base; a dumping gel box fixedly mounted on the actuator base and formed with grooves at approximately central positions on both side surfaces of the dumping gel box with the grooves being open at the top and bottom of the dumping gel box; a connection wiring of a flexible printed circuit formed with a plurality of lands at both end portions thereof, folded in substantially U-shape and brought into contact with a back surface and side surfaces of the dumping gel box to close side openings of the grooves with its both end portions; thermosetting adhesive filled in the grooves and heated to adhere both end portions of the connection wiring to the both side surfaces of the dumping gel box; a lens holder for holding an objective lens for projecting laser beam onto a disk and coils for driving the lens holder by electromagnetic force; and a plurality of elastic wires extending from the lens holder and soldered to the lands of the connection wiring at their end portions; and wherein air discharging holes are formed on the dumping gel box to communicate the lower end portions of the grooves with outside atmosphere.

According to the optical pickup of the configuration as mentioned above, the side openings of the grooves formed on both side surfaces of the dumping gel box are closed by the both end portions of the connection wiring with the openings of the grooves at the bottom of the dumping gel box being closed by the actuator base. However, as the air discharging holes are formed on the dumping gel box to communicate the lower end portions of the grooves with outside atmosphere, air in the grooves escapes through the air discharging holes when the thermosetting adhesive is filled in the grooves from top openings. Consequently, the thermosetting adhesive is sufficiently filled in the grooves without unfilled space to adhere the both end portions of the connection wiring to the side surfaces of the dumping gel box reliably, and the optical pickup of the present invention is free from the drawback of the prototype optical pickup that air accumulation is caused in each groove and the both end portions of the connection wiring are likely to peel from the both side surfaces of the dumping gel box.

DESCRIPTION OF THE PREFERRED EMBODIMENT

Figure 1A:
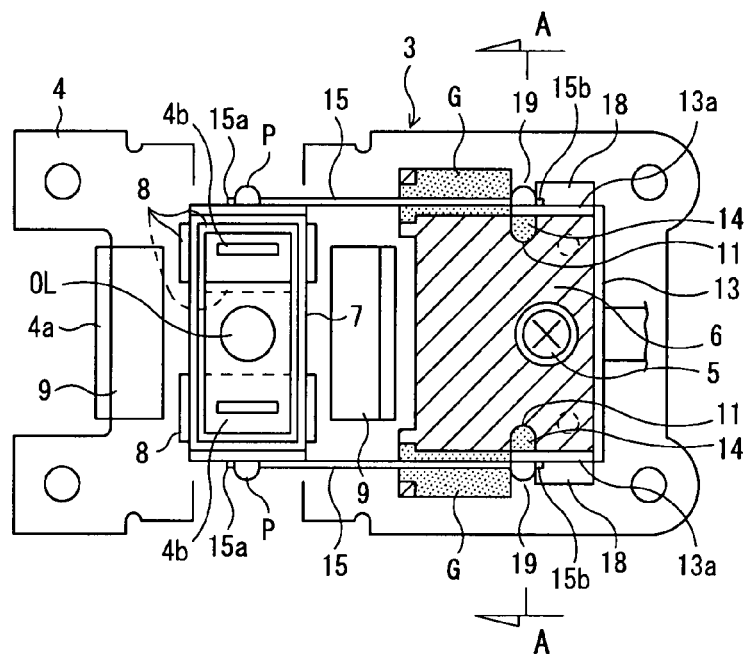
FIG. 1(a) is a partially cutout plan view of an actuator of an optical pick up according to an embodiment of the present invention.
Figure 1B:
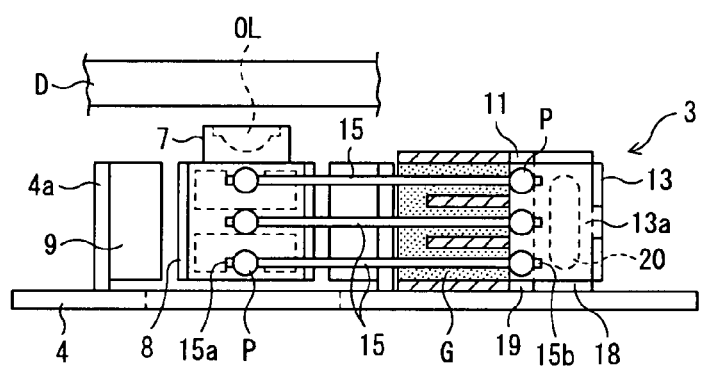
FIG. 1(b) is a partially cutout side view of the same.
Figure 1C:
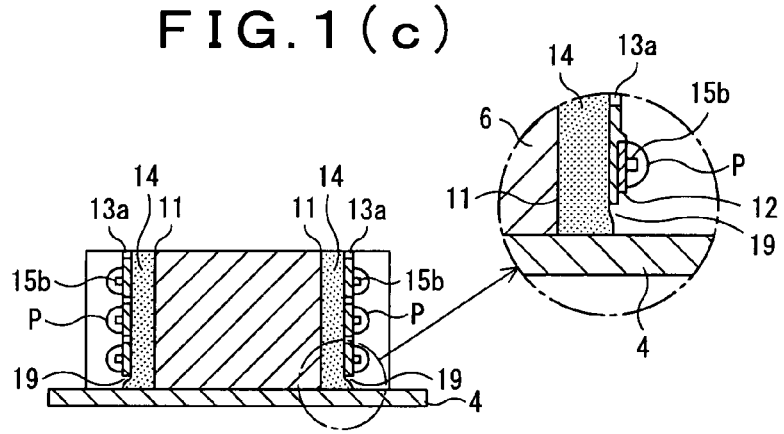
FIG. 1(c) is a cross-sectional view taken along the line A-A of FIG. 1(a)
Figure 2:
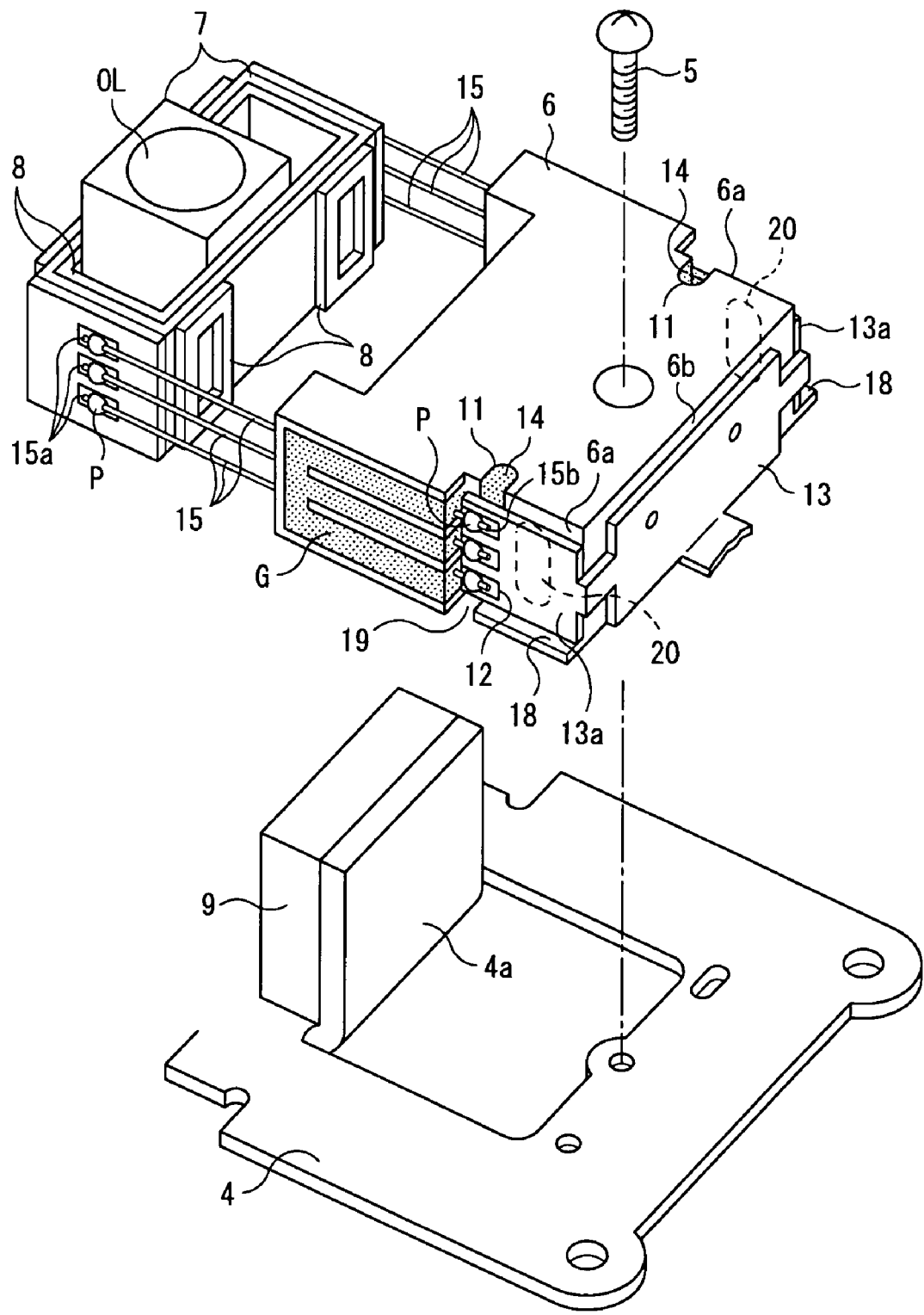
FIG. 2 is an exploded perspective view of the optical pickup.
Figure 3:
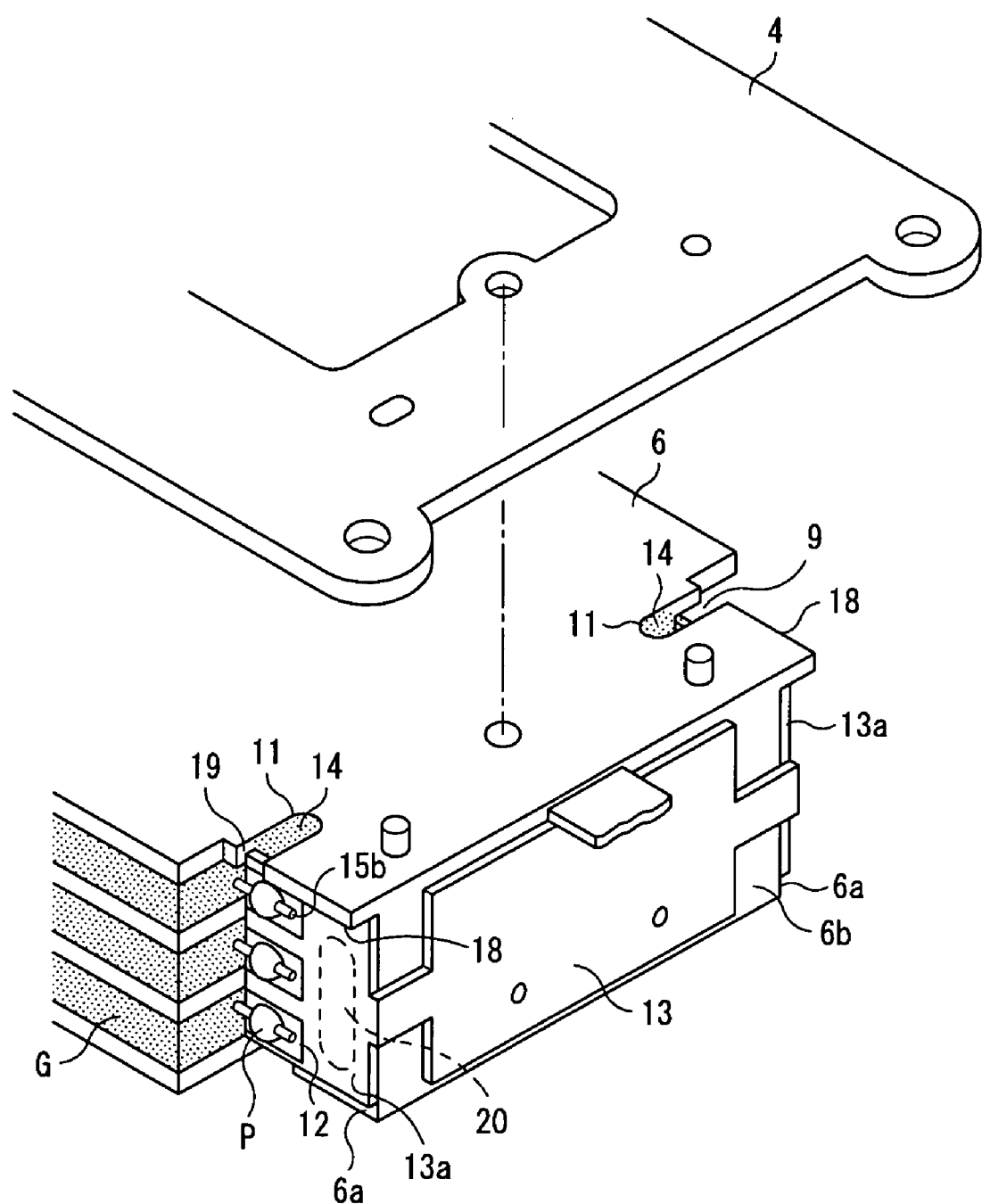
FIG. 3 is a partial exploded perspective view of the optical pickup as viewed from its bottom, FIGS. 4 (a) through (c) are perspective views showing a process for assembling the optical pickup.

FIGS. 1 through 4 show an actuator 3 of an optical pickup according to an embodiment of the present invention. The actuator 3 is provided with guide pieces or portions or guide members 18 formed in the shape of flange along the lower edge of side surfaces 6a of a dumping gel box 6 integrally with the dumping gel box 6 to support the lower side of a connection wiring 13. Each of the guide pieces or portions 18 is cutout at the position opposing to a groove 11 to form an air discharging hole 19 for communicating the lower end portions of the groove 11 with outside atmosphere. The configuration of the actuator 3 is the same as that of the prototype actuator shown in FIG. 5 except for the configuration of the guide pieces or portions and their cutouts. Accordingly, the same or like elements are denoted by the same or like reference numerals or reference marks and description thereof is not made.

Figure 4A:
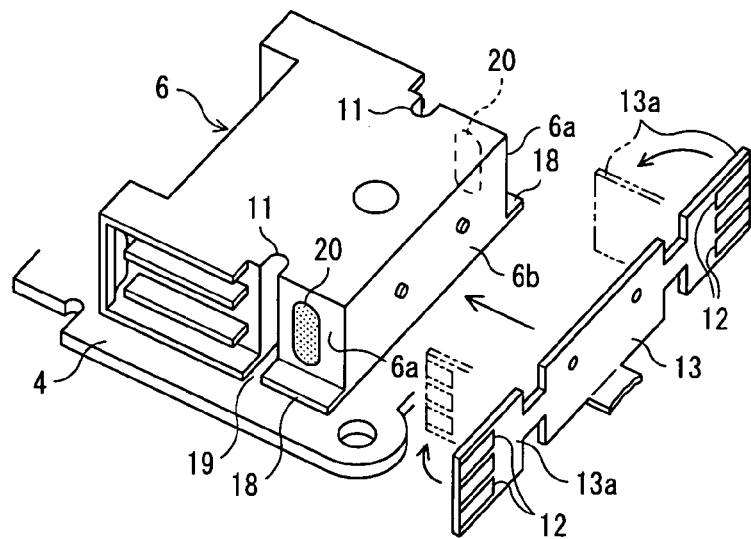
Figure 5:
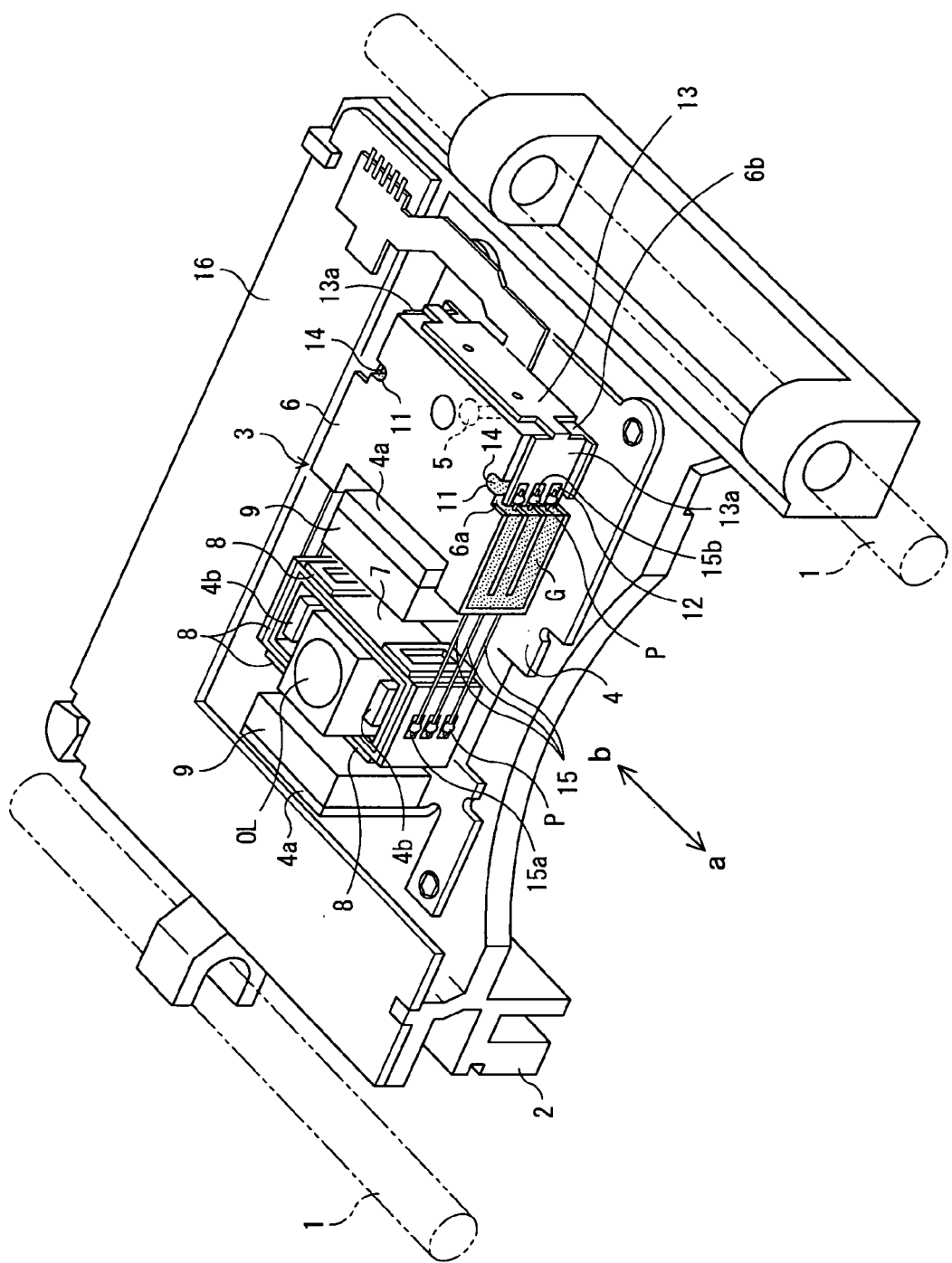
FIG. 5 is a perspective view of a prototype optical pickup.

A process of assembling the actuator 3 of an optical pickup according to an embodiment of the present invention will now be described. As shown in FIG. 4(a), quick-drying adhesive 20 is applied to both side surfaces 6a of the dumping gel box 6 and both end portions 13a of a flexible and elastic connection wiring 13 in the form of flexible film or strip are folded against its elasticity to make the connection wiring in the form of substantially U-shape and the connection wiring 13 of the substantially U-shape is brought into contact with the back surface 6b and the both side surfaces 6a of the dumping gel box 6 to extend over the surfaces with the lower edge of the connection wiring 13 extending over the guide piece or portion 18.

Figure 4B:
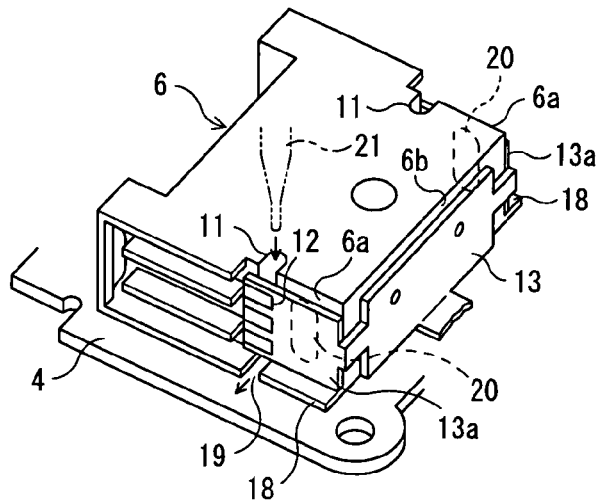

As shown in FIG. 4(b), the both end portions 13a of the connection wiring 13 are adhered tentatively by the quick-drying adhesive 20 to the both side surfaces 6a of the dumping gel box 6 with the both end portions 13a of the connection wiring 13 covering and closing the side openings of the grooves 11. Thus, the both end portions 13a of the connection wiring 13 are prevented from restoring by their elasticity to the straight condition (as shown by solid line in FIG. 4(a)).

By means of a syringe or dropper 21 as shown by a phantom line in FIG. 4(b), thermosetting adhesive 14 is filled in each groove 11 through its upper opening, and is heated, for example, at 80° C. for 20 to 30 minutes to be set or cured and finally adhere the both end portions 13a of the connection wiring 13 to the both side surfaces 6a of the dumping gel box 6. At that time, the air in the grooves 11 is let out or discharged through the air discharging hole 19 to the outside atmosphere so that the thermosetting adhesive 14 is filled in the groove 11 without causing air accumulation therein. (see FIG. 1(c))

Figure 4C:
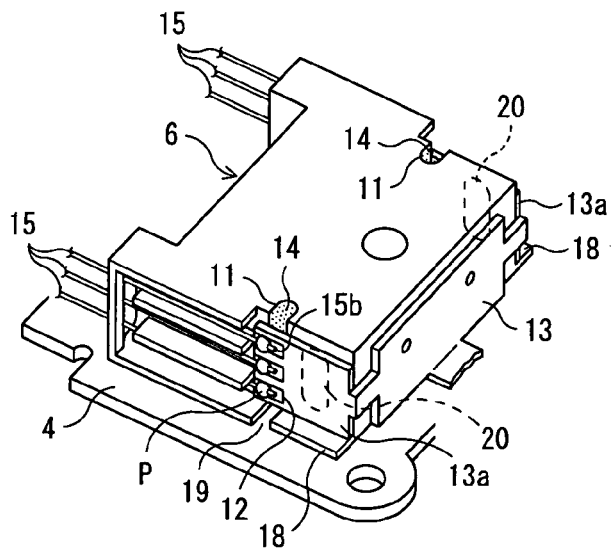

As shown in FIG. 4(c), the other ends 15b of the elastic wires 15 extending from the lens holder 7 are attached to respective lands 12 of the connection wiring 13 and soldered thereto to form soldering portions P.

According to the configuration of the embodiment as mentioned above, although the side openings of the grooves 11 formed on the both side surfaces 6a of the dumping gel box 6 are covered and closed by the both end portions 13a of the connection wiring 13 with the bottom openings of the grooves 11 are closed by the actuator base 4, the dumping gel box 6 is formed at lower ends of the grooves 11 with air discharging holes 19 which communicate with outside atmosphere. As the result, when the thermosetting adhesive 14 is filled in the grooves 11 through their upper or top openings, the air in each groove 11 escapes through the air discharging holes 19 to the outside so that the thermosetting adhesive 14 is filled in each groove 11 sufficiently without leaving adhesive unfilled space, and the both end portions 13a of the connection wiring 13 are reliably adhered to the both side surfaces 6a of the dumping gel box 6. Thus, the embodiment of the present invention has resolved the problem of the prototype that air accumulation is formed in each groove 11 to cause peeling off of the end portions 13a of the connection wiring 13 from the side surfaces 6a of the dumping gel box 6, making it difficult to accurately drive the lens holder 7 as desired.

In addition, as the flange shaped guide pieces or portions 18 are provided integrally with the dumping gel box 6 along the bottom edges of its side surfaces 6a, the connection wiring 13 can be arranged to be in contact with the back surface 6b and side surfaces 6a of the dumping gel box 6 with the connection wiring 13 being folded to have a substantially U-shape and the bottom edge of the connection wiring 13 being in contact with and extending along the respective guide pieces or portions 18. Moreover, the air discharging holes 19 are formed only by cutting out the guide pieces or portions 18 at the position opposing to the grooves 11 so that the actuator of the embodiment is simple in structure and is produced at low cost.

Still further, as the connection wiring 13 attached in the U-shape to the back surface 6b and side surfaces 6a of the dumping gel box 6 is temporally and instantaneously adhered to the dumping gel box 6 by the quick-drying adhesive 20, the connection wiring 13 can be reliably adhered by means of the thermosetting adhesive 14 as desired.

Although the air discharging holes 19 for communicating the lower end portions of the grooves 11 with the outside atmosphere are formed by cutting out the guide pieces or portions 18 at the portions opposing to the grooves 11, the present invention is not limited to that structure, but the air discharging holes 19 may be formed at some appropriate positions of the dumping box 6 other than on the guide pieces or portions 18. For example, grooves extending outwards from the position opposing to the bottom end of the grooves 11 may be formed on the actuator base 4, or through holes may be formed in the actuator base 4 at the positions opposing to the grooves 11 to communicate therewith.

According to an aspect of the embodiment of the present invention as described above, an optical pickup comprises an actuator base; a dumping gel box fixedly mounted on the actuator base and formed with grooves at approximately central positions on both side surfaces of the dumping gel box with the grooves being open at the top and bottom of the dumping gel box; a connection wiring of a flexible printed circuit formed with a plurality of lands at both end portions thereof, folded in substantially U-shape and brought into contact with a back surface and side surfaces of the dumping gel box to close side openings of the grooves with their both end portions; thermosetting adhesive filled in the grooves and heated to adhere both end portions of the connection wiring to the both side surfaces of the dumping gel box; a lens holder for holding an objective lens for projecting laser beam onto a disk and coils for driving the lens holder by electromagnetic force; and a plurality of elastic wires extending from the lens holder and soldered to the lands of the connection wiring at their end portions; and wherein guide members are provided integrally with the dumping gel box along bottom edges of both side surfaces of the dumping gel box to support the lower edge of the connection wiring, and portions of the guide members opposing to the grooves are cut out to form air discharging holes for communicating the lower end portions of the grooves with outside atmosphere.

According to the optical pickup of the configuration as mentioned above, the side openings of the grooves formed on both side surfaces of the dumping gel box are closed by the both end portions of the connection wiring with the openings of the grooves at the bottom of the dumping gel box being closed by the actuator base. However, as the air discharging holes are formed on the dumping gel box to communicate the lower end portions of the grooves with outside atmosphere, air in the grooves escapes through the air discharging holes when the thermosetting adhesive is filled in the grooves from the top openings of the grooves. Consequently, the thermosetting adhesive is sufficiently filled in the grooves without adhesive unfilled space to adhere the both end portions of the connection wiring to the side surfaces of the dumping gel box reliably, and the optical pickup of the present invention is free from the drawback of the prototype optical pickup that air accumulation is caused in each groove and the both end portions of the connection wiring are likely to peel from the both side surfaces of the dumping gel box.

In addition, as the guide members are formed integrally with the dumping gel box along the bottom edges of the side surfaces of the dumping gel box, the connection wiring can be attached as desired to the back surface and side surfaces of the dumping gel box with the connection wiring being in U-shape and its lower edge being in contact with and extending along the guide member. Moreover, the air discharging holes are formed only by cutting out the guide pieces or portions at the position opposing to the grooves so that the actuator of the embodiment is simple in structure and is produced at low cost.

According to another aspect of the embodiment, the optical pickup is provided with guide members integrally with the dumping gel box along bottom edges of both side surfaces of the dumping gel box to support the lower edge of the connection wiring, and portions of the guide members opposing to the grooves are cut out to form air discharging holes for communicating the grooves with outside atmosphere, the connection wiring are folded to have a substantially U-shape and brought into contact with the back surface and the both side surfaces of the dumping gel box, with the bottom edge of the connection wiring being in contact with and extending along the respective guide pieces or portions and both end portions of the connection wiring being adhered to the both side surfaces of the dumping gel box by quick drying adhesive to close the both side openings of the grooves.

As the both end portions of the connection wiring which has been folded to have a U-shape and attached to the back surface and the both side surfaces of the dumping gel box, are tentatively adhered to the both side surfaces of the dumping gel box by quick drying adhesive, the connection wiring can be reliably adhered to the dumping gel box by means of the thermosetting adhesive as desired.

Further, according to a still another aspect of the present invention, the optical pickup is produced by a method comprising forming grooves at approximately central positions on both sides of a dumping gel box with the grooves being open at the top and bottom of the dumping gel box; providing guide members integrally with the dumping gel box along bottom edges of both side surfaces of the dumping gel box; forming cutouts on the guide members at positions opposing to the grooves to communicate the grooves with outside atmosphere; attaching a connection wiring of a flexible printed circuit having a plurality of lands on both end portions thereof to a back surface and side surfaces of the dumping gel box while folding the connection wiring in substantially U-shape, so as to close side openings of the grooves with the bottom edge of the connection wiring extending along the guide member; tentatively adhering both end portions of the connection wiring to the both side surfaces of the dumping gel box by quick drying adhesive; filling the grooves with the thermosetting adhesive; and heating the thermosetting adhesive to finally adhere the both end portions of the connection wiring to the both side surfaces of the dumping gel box.

According to the method for producing the optical pickup, the connection wiring is tentatively and instantaneously fixed to the both side surfaces of the dumping gel box by quick drying adhesive and the connection wiring can be finally fixed on the dumping gel box with reliability by the thermosetting adhesive. In addition, the air outlet hole can be formed only by partially cutting out the guide members, the optical pickup can be simple in construction and can be manufactured at low cost.

As an embodiment of the present invention has been described, the present invention should not be limited to the embodiment but variations, modifications and improvements therefrom are available by those skilled in the art.

What is claimed is:

1. An optical pickup comprising
   an actuator base;
   a dumping gel box fixedly mounted on the actuator base and formed with grooves at approximately central positions on both side surfaces of the dumping gel box with the grooves being open at the top and bottom of the dumping gel box;
   a connection wiring of a flexible printed circuit formed with a plurality of lands at both end portions thereof, folded in substantially U-shape and brought into contact with a back surface and side surfaces of the dumping gel box to close side openings of the grooves with its both end portions;
   thermosetting adhesive filled in the grooves and heated to adhere both end portions of the connection wiring to the both side surfaces of the dumping gel box,
   a lens holder for holding an objective lens for projecting laser beam onto a disk and coils for driving the lens holder by electromagnetic force, and
   a plurality of elastic wires extending from the lens holder and soldered to the lands of the connection wiring at their end portions; and
   wherein guide members are provided integrally with the dumping gel box along bottom edges of both side surfaces of the dumping gel box to support the lower edge of the connection wiring, and portions of the guide members opposing to the grooves are cut out to form air discharging holes for communicating the lower end portions of the grooves with outside atmosphere.

2. An optical pickup comprising
   an actuator base;

a dumping gel box fixedly mounted on the actuator base and formed with grooves at approximately central positions on both side surfaces of the dumping gel box with the grooves being open at the top and bottom of the dumping gel box;

a connection wiring of a flexible printed circuit formed with a plurality of lands at both end portions thereof, folded in substantially U-shape and brought into contact with a back surface and side surfaces of the dumping gel box to close side openings of the grooves with its both end portions;

thermosetting adhesive filled in the grooves and heated to adhere both end portions of the connection wiring to the both side surfaces of the dumping gel box, a lens holder for holding an objective lens for projecting laser beam onto a disk and coils for driving the lens holder by electromagnetic force, and a plurality of elastic wires extending from the lens holder and soldered to the lands of the connection wiring at their end portions; and wherein air discharging holes are formed on the dumping gel box to communicate the lower portions of the grooves with outside atmosphere.

3. The optical pickup according to claim 2 wherein the guide members are provided integrally with the dumping gel box along bottom edges of both side surfaces of the dumping gel box to support the lower edge of the connection wiring, and portions of the guide members opposing to the grooves are cut out to form air discharging holes for communicating the grooves with outside atmosphere, the connection wiring are folded to have a substantially U-shape and the bottom edge of the connection wiring being in contact with and extending along the respective guide members with both end portions of the connection wiring being adhered to the both side surfaces of the dumping gel box by quick drying adhesive.

4. The optical pickup according to claim 2 wherein each of the guide members are in the forms of flange.

5. A method for producing an optical pickup comprising
forming grooves at approximately central positions on both sides of a dumping gel box with the grooves being open at the top and bottom surfaces of the dumping gel box;

providing guide members integrally with the dumping gel box along bottom edges of both side surfaces of the dumping gel box;

forming cutouts on the guide members at positions opposing to the grooves to communicate the grooves with outside atmosphere;

attaching a connection wiring of a flexible printed circuit having a plurality of lands on both end portions thereof to a back surface and side surfaces of the dumping gel box while folding the connection wiring in substantially U-shape so as to close side openings of the grooves with the bottom edge of the connection wiring extending along the guide member;

tentatively adhering both end portions of the connection wiring to the both side surfaces of the dumping gel box by quick drying adhesive, filling the grooves with the thermosetting adhesive, and heating the thermosetting adhesive to finally adhere the both end portions of the connection wiring to the both side surfaces of the dumping gel box.

* * * * *